United States Patent

[11] 3,569,708

| [72] | Inventors | Hillel Weinbaum;<br>Michael H. Badger, Houston, Tex. |
|---|---|---|
| [21] | Appl. No. | 656,088 |
| [22] | Filed | July 26, 1967 |
| [45] | Patented | Mar. 9, 1971 |
| [73] | Assignee | American Machine & Foundry Company<br>New York, N.Y. |

[54] STRAIGHT THROUGH AND BACKSCATTER RADIATION INSPECTION APPARATUS FOR TUBULAR MEMBERS AND METHOD
37 Claims, 4 Drawing Figs.

| [52] | U.S. Cl. | 250/83.3, 250/52, 250/71.5 |
|---|---|---|
| [51] | Int. Cl. | G01t 1/20 |
| [50] | Field of Search | 250/83.3 (D), 52, 71.5 |

[56] References Cited
UNITED STATES PATENTS

| 3,012,140 | 12/1961 | Pellissier et al. | 250/83.3D |
|---|---|---|---|
| 3,180,985 | 4/1965 | Leighton | 250/83.3D |
| 3,193,680 | 7/1965 | Anderson | 250/83.3D |
| 3,210,545 | 10/1965 | Barnett | 250/83.3D |
| 3,387,133 | 6/1968 | Chope | 250/83.3D |

*Primary Examiner*—Archie R. Borchelt
*Attorneys*—George W. Price and John H. Gallagher ABSTRACT: This invention pertains to a combination straight through and backscatter inspection of pipe wall thickness in a rotating arrangement. The source is located outside the pipe, one detector is located thereopposite and the other detector is located to receive backscatter emissions. Each detector and related circuit comprises a scintillation crystal, a photomultiplier controlled by a DC-to-DC converter and adjustable low voltage source, an electrical speed compensation circuit, a cross section integrator and a curve fitting amplifier. The two detector circuit outputs are correlated to increase sensitivity. The speed determining and position sensing means may be a selsyn motor. The speed compensating circuit may be a field effect transistor having its drain-source resistance variable with the speed voltage and included in a time constant circuit, thereby making the output independent of the speed of rotation.

Hillel Weinbaum
Michael H. Badger
INVENTORS

BY Arnold, Roylance, Kruger & Durkee
ATTORNEYS

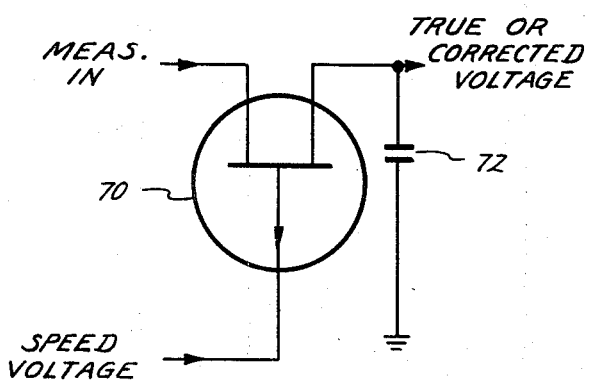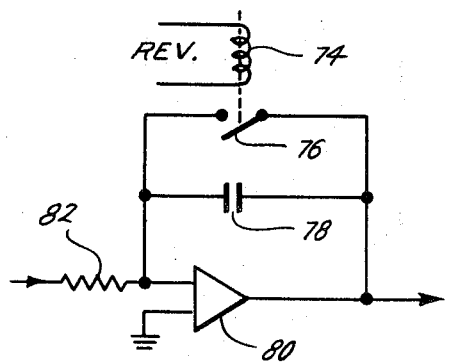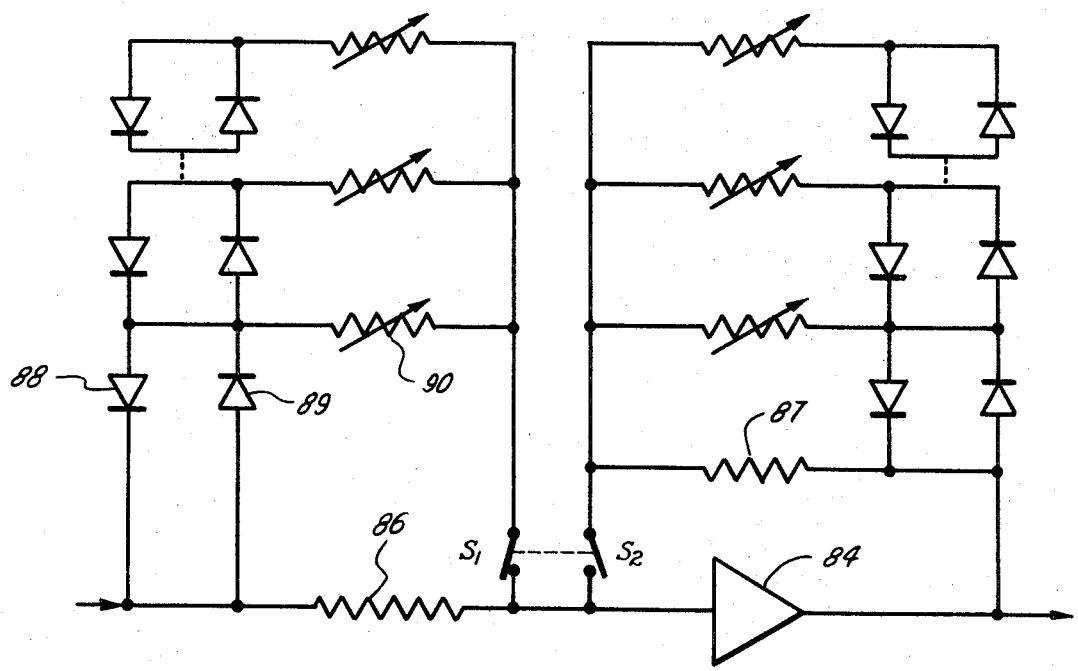

STRAIGHT THROUGH AND BACKSCATTER RADIATION INSPECTION APPARATUS FOR TUBULAR MEMBERS AND METHOD

This invention pertains to apparatus and method for inspecting tubular goods by radiation techniques and more particularly to the inspection of such goods, typically pipe used in the oil and gas industry, by a unique combination and arrangement of components effecting correlated inspection utilizing direct radiation and scattered radiation.

To inspect pipe by radiation techniques, especially using suitable gamma ray transmitting and receiving apparatus, it has heretofore been the practice to use a radiation source located outside an inspected specimen pipe and a detector inside, as shown by U.S. Pat. No. 2,965,758; to utilize a source outside and a receiver on the diametrically disposed opposite side such that the pipe wall not only near the source, but also away from the source effected the detection radiation, as shown in U.S. Pat. No. 3,099,746; or to use a radiation source within the pipe along with a receiver longitudinally located therefrom to measure qualities within the pipe using backscatter principles, as shown in U.S. Pat. No. 2,277,756.

Although certain conditions may be monitored and calculated or estimated using these and similar prior art techniques, the need for a fast scanning gamma ray inspection apparatus that fully and reliably measures the wall thickness of a pipe has continued to be needed. The present disclosure describes a preferred embodiment of an apparatus that fulfills the need.

What is described herein is a versatile, yet simple, apparatus having many unique components, but generally, in the preferred embodiment thereof, comprising rotating radiation and electronic parts operatively constructed to inspect a longitudinally translated pipe using both straight through gamma ray inspection techniques and backscatter techniques. So as to make optimumly meaningful the accumulated collected data, speed compensating circuits are employed. Also, to make the output indication susceptible to even small changes, correlation of the developed data from straight through and backscatter inspection is provided. Finally, to compensate for the fact that electronic signals developed from radiation inspection are not linear, compensation circuits of unique design are provided so that the eventually developed end data from the overall apparatus is directly proportional to the wall thickness of the pipe measured.

Before describing the apparatus in detail, it should first be mentioned that the straight through inspection technique makes the most reliable use of the penetrating ray emanated from the source in narrow beamlike fashion. Normally, a measure of the wall thickness of two diametrically opposed wall sides provides a reliable indication that, in the particular plane where inspection is instantaneously occurring, the average thickness of the two walls is either all right or at least one side is abnormally thin (being abnormally thick is usually of no concern). But in the relatively rare instance where the pipe is eccentric, there is a false indication of normalcy, the too thin wall being compensated for by the too thick wall. Therefore, a quality assurance, backup system of inspection is helpful to give a little more data. The backscatter apparatus is useful for this purpose.

The backscatter system inspects only one of the two wall sides inspected by the straight through inspection apparatus, but it does so at a much lesser radiation level than in the straight through inspection. Being at a low energy level means that the detected results are susceptible to noise to a much greater degree and that inspection at the high rate of speed possible when only straight through inspection is being performed is not possible. However, if there are any suspicious areas inspected, the backscatter system increases the credibility of results and eliminates ambiguities altogether.

So that the manner in which the above-recited advantages and objects of the invention, as well as others which will become apparent, are attained can be understood in detail, more particular description of the invention briefly summarized above may be had by reference to the embodiment thereof which is illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the drawings:

FIG. 2 is a schematic diagram of a preferred speed compensating means including a field effect transistor that may be used in the block diagram shown in FIG. 1;

FIG. 3 is a schematic diagram of a preferred cross section integrator circuit that may be used in the block diagram shown in FIG. 1; and FIG. 4 is a schematic diagram of a preferred curve fitting amplifier that may be used in the block diagram shown in FIG. 1.

Figure 1:
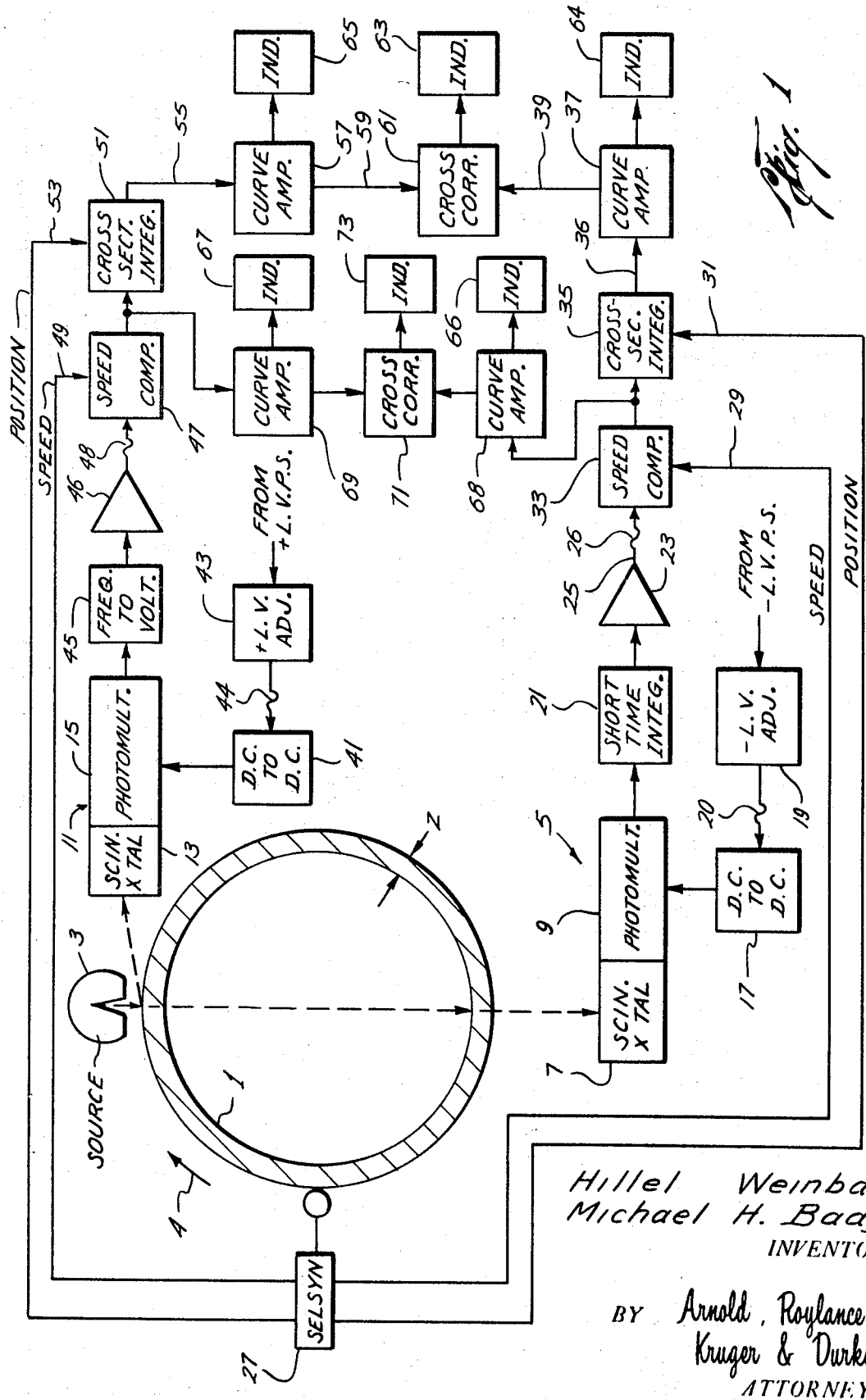
FIG. 1 is an overall block diagram of an illustrated embodiment of the invention, also showing the cross section of an inspected member.

Referring now to the drawings, and first to FIG. 1, a pipe 1 is illustrated in position for inspection by suitable gamma ray inspection apparatus to be hereinafter described. Generally, the pipe is mounted for longitudinal translation past the mounted radiation and electrical components by any well-known translating means, which could merely be simple simultaneously driven, rack-mounted supporting rollers (not shown). Such translating arrangement ensures that a pipe of substantially regular contours translates with its axis in approximately the same line. To further ensure such action, however, suitable axis-centering means may be employed.

The equipment mounted for rotational movement about pipe 1 includes the source 3 of gamma rays, receiving means 5 for receiving straight through radiations, receiving means 11 for receiving backscatter radiation reflections, a speed and rotational position-sensing means, and certain related electronic components, all of which are further set out in detail below. Electrical outputs and certain applied input voltages for rendering the rotationable electronic components operable are supplied through appropriate slip ring connections, which are well known in the prior art. The nonrotating electrical components may be mounted conveniently in the chassis of a convenient indicating console. Although the above-described mounting arrangement has been preferably employed, it is possible to use stationary radiation and electronic components and to helically translate pipe 1 therepast to accomplish the same helical inspection accomplished by the apparatus just described. But more even and controlled inspection is made with the preferred arrangement. However, in order to inspect the entire periphery of the pipe, some sort of means for effectively achieving relative rotation between the source and the two detector means must be included.

In the illustrated embodiment, pipe 1, having a nominal wall thickness 2, and having the rotating inspection components moving with respect thereto in a direction 4 at a nominal rate has located on the outside thereof a source 3 of penetrating rays for directing a narrow beam at and through the near wall of the pipe, through the internal opening of the pipe and through the diametrically opposite wall. Source 3 may be of any convenient, substantially uniform gamma ray emanating substance, such as a single radioisotope of cesium material encased in a lead container and having a small-shaped opening suitable for developing a narrow beam at a right angle to the axis of pipe 1 and directly in an intersecting line therewith.

Receiver or detector means 5 is disposed within the path of the ray emanating from source 3 after the ray has penetrated both walls just described. Detector 5 and its related components are sometimes hereinafter referred to together as the "straight through" detector. It is important to note that as the wall dimension becomes thinner in cross-sectional area (assuming the density material of the pipe remains constant) more radiation reaches the straight through detector, and vice versa. In other words, the amount of radiation received is inversely a function of the wall thickness of pipe 1.

Another detector 11, of similar construction with detector 5, is located on the outside of the inspected pipe near source 3 to receive the backscatter emissions. For convenience, the wall located nearest the source and off which backscatter emissions are received by detector 11, is sometimes hereinafter referred to as the "near" wall. Also, detector 11 and related components are sometimes hereinafter referred to as the backscatter detector.

Each detector 5 and 11 comprises a scintillation crystal 7 or 13 operatively disposed adjacent a photomultiplier tube 9 or 15. The scintillation crystal may be of sodium iodide, cesium iodide, or other suitable material responsive to the received radiations and capable of causing the related photomultiplier to be actuated in response to the received emissions. The produced output signal of detector 11 is proportional to and hence a function of the strength of the ray emerging from the tested pipe, which, in turn, is a direct function (not inverse, as with the straight through detector operation based on the photoelectric effect of emissions) of the thickness of the near wall of the pipe traversed by the ray from source to receiver 5.

Since abnormal thinness (below a nominal wall thickness value) results in a large signal at detector 5, when the output value goes beyond a certain nominal value, the pipe wall at the inspected location has become too thin.

A photomultiplier used as tube 9 and 13 conventionally comprises a cathode, a plurality of dynodes (approximately 8 to 12 in number) and an anode. The gain of the photomultiplier and hence the sensitivity control for the photomultiplier is the applied high DC voltage connected to each of the dynodes. A maximum applied DC voltage for achieving maximum sensitivity by the detector results in an amplification by the tube on the order of approximately 2,000,000. On the lower side with very little high voltage applied (only enough to make the photomultiplier operable), the amplification is on the order of approximately 1,000. The nature of the source of the applied DC voltages to each photomultiplier 9 and 15 is described below in greater detail.

The output from the photomultiplier is a series of pulses. The frequency of the occurrence of these pulses is directly related to the number of radiation emissions received and detected. The magnitude of each pulse is related to the strength with which the radiation emissions are received. Hence, there are two qualities of the output signal from the photomultiplier that may be used as a means for eventually developing a signal suitable for giving an output indication.

Means may be provided and included in the detector to eliminate the effects of spurious responses that may distort the received ray emissions in that they carry no meaningful intelligence. A simple discriminator circuit preset so that emission energy within a certain level causes a response is a helpful device for eliminating these undesirable effects, which may be characterized as noise.

As previously mentioned, the amplification of the photomultiplier is controlled by a high voltage applied to the dynodes thereof. This applied high voltage may be conveniently derived from a DC to DC converter circuit 17 or 41. Typically, a DC-to-DC converter comprises an input chopper stage, an amplifier stage and a rectifier stage. The chopper stage receives the low voltage input applied to the circuit and converts it to an AC form suitable for convenient voltage amplification. The amplifier stage (or stages) boosts the voltage by the desired amount. A series of high gain amplifiers, or alternately a transformer, may be included to achieve the high voltage level required. Finally, a rectifier or other convenient means converts the high voltage AC back to a DC voltage suitable as a control voltage for the dynodes of the photomultiplier.

The input to the DC-to-DC converter may be any suitable and adjustable low voltage source. Available for operating electronic components, particularly those employing transistorized parts, are both positive and negative voltages on the order of 15 to 24 volts. When either of these voltages is applied to a voltage adjustment means, the result is an excellent source of sensitivity adjustment voltage for application to a DC-to-DC converter, as just described Since there are two DC-to-DC converters included in 15 overall apparatus, namely, converters 17 and 41, which must be separately adjusted (the straight through detector operating with a higher energy received emission that the backscatter detector), it is convenient to use the positive available low voltage source in conjunction with one voltage adjustment means 43 and the negative low voltage source in conjunction with the other voltage adjustment means 19. The desirable isolation between the sources is effectively achieved, the separate low voltages are already available and easily connectable through the slip rings 20 and 44 (between the respective adjustment means and converters) that provide connection to the rotating electronic components, and the DC-to-DC converters operate equally well to either an applied negative or positive voltage (the chopper, amplification and rectifying stages removing any initial direction of DC bias). The inputs to the adjustment means are from the available positive and negative low voltage power supply needed for operating the electronic circuits associated herewith, in general.

It has been previously mentioned that the sensitivity of the straight through detector needs to be less than the backscatter detector (since the measuring of backscatter radiations inherently utilizes only a small faction of the originally emanated ray that is utilized in a straight through radiation measurement). But, it is necessary to have a preset uniform amount of detection sensitivity in order to achieve reliable results. Control by the low voltage adjustment means just described is desirable to provide means for maintaining uniform sensitivity and the desirable adjustment. Moreover, since the adjustment means are included in the non rotating equipment, remote sensitivity adjustments are provided that may be made without stopping and starting the rotating apparatus.

The output from straight through detector 5 is conveniently applied through a short-time averager circuit 21, which may be merely an integrator circuit or other storage means with a very short time constant. As previously mentioned, the pulses produced by the photomultiplier are at varying amplitudes dependent upon the strength of the received radiations. Also, the quantity of the received radiations per unit of time is a measure of radiation strength. By utilizing a short-time averaging circuit 21, both these qualities of the produced output from the photomultiplier are translated into a meaningful output, smoothed considerably from appearing as noise, but having an output waveform with a high frequency appearance, the envelope of which is a function of the density of the material.

The output from short-time averager circuit 21 is applied to a buffer amplifier 23 or other buffer means of conventional design, after which the output signal is applied through slip rings 26 of the rotating equipment to the external electronic equipment components.

The output from backscatter detector 11 is passed through a frequency-to-voltage circuit means 45, which may conveniently take the form of a rate counter meter. It is recognized that since the backscatter detector is operating at an energy level of received radiation much less than that of the straight through detector, on the order of one-fifth, the most meaningful information in the output from the photomultiplier is that information related to frequency of occurrence. Therefore, a circuit that translates frequency into voltage, such as the standard rate count meter, may be employed to produce a suitable output signal. Again, depending on the damping or time constant characteristics of the circuit, the output will be a signal having an envelope which is a function of the strength of the received radiations.

A buffer amplifier 46 or other buffer means may be used to supply the developed backscattered signal just described to the appropriate slip rings 48 of the rotating assembly. From the slip rings the signal is supplied to the remainder of the electronic components treating the signal in a manner to be described.

So far the development of a straight through signal and a backscatter signal has been described which has not taken into account the relative rotational movement between the inspected pipe and the radiation inspection equipment. The most meaningful signals that may be developed take into account a standard illumination of a fixed area of the pipe wall with a substantially controlled source of radiation. That is, since the total quantity of metal between source and detector varies when the relative rotation between the pipe and both the source and detectors varies, there needs to be some sort of compensation of the eventually developed signal for the fact that the emanating radiations from the source remain constant. If such compensation is not included, as the relative movement increased and more metal intervened between source and detector, less radiation would be received by the detector and hence there would be a false indication of the material becoming thicker than the nominal value. If there was a slowing down of the relative rotational movement, of course the opposite would be true.

Hence, a circuit is included that ensures that the same amount of apparent radiation for a constant or unit area of cross section of the pipe appears to be present regardless of variations in relative rotation, without actually changing the quantity of radiation. This amount of area is directly related to a specific length of a circumferential arc of the pipe, since the output assumes that the thickness of pipe is a predetermined and fixed nominal dimension. Therefore, it should be understood that the compensation to be described is one for varying speed conditions.

To compensate for the slowing down or speeding up effects of relative movement a speed monitoring device is employed to independently develop a voltage proportional to speed. This device may conveniently take the form of a tachometer or selsyn motor 27. A selsyn motor of conventional design not only develops a voltage proportional to speed, but also can be used to develop a rotational position indication, which is useful in the electronic circuit to be described.

Now referring to FIG. 2, a circuit showing a field effect transistor 70 is shown as a useful speed compensating means in the application just described at both 33 and 47, the speed voltage 29 and 49 being applied in both cases. This field effect transistor is illustrated as a P-channel transistor, although an N-channel transistor would work just as well, depending upon the applied polarity of the input voltage.

The measured voltage just described for the straight through or backscatter detector is applied to the gate of the field effect transistor. For a relative rotation of a nominal speed, the voltage from the speed monitoring means is applied to the N unipolar element of the transistor to cause the transistor to conduct and have established therethrough a nominal current and hence a nominal drain-source resistance. This resistance becomes part of a time constant network by connecting a capacitor 72 from the output element of transistor 70 to the circuit ground. For a nominal speed, there is a nominal output.

It may be seen that as the speed increases, the voltage on the base of the transistor becomes greater and causes the current though the transistor to establish a lower drain-source resistance. This shortens the effective time constant of the circuit and produces a signal which corrects for the fact that more of the circumferential arcuate length of the pipe passes past the source and receiver per unit of time than under nominal speed conditions.

To develop a signal that is a measure of the cross-sectional area of the pipe around its periphery or a known portion of its periphery, the circuit shown in FIG. 3 may be utilized at 35 and 51 in FIG. 1. Essentially, the circuit is an integrator comprising an amplifier 80, an input resistor 82 and an integrating capacitor 78 reset by a relay contact 76 controlled by coil 74.

Every time the rotational position sensing or monitoring means indicates that a certain, predetermined portion of the circumference of the pipe has passed by a fixed point, an impulse is produced for instantaneously energizing relay coil 74. Upon energizing of coil 74, related contact 76 is closed, thereby discharging the stored voltage on the integrator. If the amount of voltage stored prior to discharge corresponds to the amount of output from speed compensating circuit 33 or 47 for a complete periphery scan, then the output is a measure of the cross-sectional area around the entire periphery. It should be noted that the straight through detector scheme scans the entire pipe periphery during one-half a revolution, the penetrating ray passing through two pipe wall portions at a time. Therefore, an output signal 31 for every one-half revolution of pipe 1 causes cross-sectional integrator 35 in the straight through detector circuit to produce an output 36 that is a measure of a complete peripheral cross section.

In the case of cross section integrator 51 in the backscatter detector circuit, a signal 53 every full revolutionary traverse causes an output 55 that is a measure of a complete peripheral cross section.

It should be noted that because of speed compensation circuits 33 and 47 discussed above, when the relative rotation is relatively fast, less total radiation is being employed to accomplish inspection than when the relative rotation is relatively slow. Hence, to obtain maximum reliable inspection, the speed should be kept low. However, to obtain rapid inspection, the speed must be kept high. Actual operating speed is therefore the agreeable compromise speed to accomplish the degree of reliable inspection desired while inspecting at a realistic inspection rate.

Outputs 36 and 55 developed for the two types of inspection just described still have one shortcoming that make them difficult to interpret. This is due to the fact that radiation quantity capable of penetrating metal for detection as described above to develop a voltage is not a linear function of the metal thickness, all other conditions being compensated for, as discussed. That is, outputs 36 and 55 if metered would not result in a linearly proportional indication of wall thickness.

To correct the nonlinear voltages, therefore, a corrective cure fitting circuit as shown in FIG. 4 is inserted in each detector circuit, namely, at 37 and 57.

The compensating network there shown has applied to it a nonlinear voltage, which may be received from one of the cross section integrators 35 or 51 and which may be considered to be a transcendental voltage, depending on the variation in the wall pipe, although the circuit works equally well with any nonlinear applied voltage. The network comprises generally an amplifier 84, an input resistor 86 (operationally modified as will be explained) and an bypass resistor 87 (also operationally modified as will be explained), the bypass connection being made directly around the amplifier and not including the input resistor.

A plurality of parallel or branch stages for compensating for a voltage range having an increasing slope is connected in parallel with input resistor 86. For instance, the first stage includes a matched diode pair 88 and 89 connected anode-to-cathode, one side of which is connected on the input side of resistor 86 and the other side of which is connected to a variable or adjustable resistor 90, which, in turn, is connected to the amplifier side of resistor 86.

Operationally, as the input voltage increases above a certain value, one of the diodes 88 or 89 begins to conduct.

It has been discovered that the range may be extended by adding stages of similar circuits in successive parallel arrangement with each other. As the voltage applied goes beyond the amplitude to cause diode 88 or 89 to fully conduct, it then successively causes the next diode to do the same after a next predetermined higher voltage amplitude of the input voltage is reached. Adjustment of the resistance values in the successive parallel circuit determines the shape that the output voltage of the circuit arrangement just described simulates, as will be more completely described below.

For an applied voltage having a slope larger than 45° ($\tan \Phi = 1$), the cascaded arrangement similarly connected in parallel with bypass resistor 87 may be used. The slope of the input voltage to the compensating circuit, as the voltage changes with wall thickness, will be dependent upon the type of radioactive ray source used. Therefore, since it will be known what the expected voltage slope will be, either the plurality of parallel stages around resistor 86 or the plurality of parallel stages around amplifier 84 may be connected for operation in the compensating network. The appropriate connection may be made by means of switches $S_1$ and $S_2$.

In operation the curve fitting network is set conveniently by the use of a standard pipe of known dimension. As each graduated dimension of this calibrating pipe is scanned, the resistor in the operating range thereof is adjusted so that the output from the entire network over its entire operating range appears to be linear.

Referring now back to FIG. 1, when curve fitting amplifiers 37 and 57 are used which have the nature of the circuit just described for FIG. 4, the result is that outputs 39 and 59 are each a linear function of the measured wall cross section in a plane of rotation of the inspected pipe (thickness times the length of the circumference as determined by the operation of cross section integrators 35 and 51, as explained above).

To make the overall apparatus more sensitive to changes, particularly important when inspection scanning is rapidly performed, a cross correlation circuit 61 may be employed, receiving the two outputs 39 and 59. Such a correlation circuit may merely be a circuit that multiplies its two input signals together. For purposes of illustrating the desirability of such a circuit, such a multiplying circuit may be assumed. For a nominal thickness, signals 39 and 59 may be each assumed to be a value 10. A change of 10 percent would result in an output value of 9 or 11. When multiplied together, however, the resulting output is 81 or 121, an apparent change of approximately twenty percent. Although a correlation scheme utilizing multiplication is advantageous, other convenient correlation methods may be used as well.

The output from cross correlator 61 may be applied to any convenient metering or indicating circuit 63. Also, for convenience, if desired, the outputs for curve amplifiers 37 and 57 may be applied to metering or indicating circuits 64 and 65, respectively, for comparison purposes.

The indications represented by indicators 63, 64 and 65 pertain to the cross-sectional area of the measured member about its entire circumference, as indicated above. If it is desired to have indications of wall thickness (as opposed to indications of cross section) recorded or otherwise metered, then it is possible to apply the outputs of the speed comparator circuits 33 and 47 to indicators 66 and 67, respectively, through curve amplifiers 68 and 69, respectively, if desired. These curve amplifiers are identical in operation to the curve amplifiers previously explained.

Finally, if it is desired to correlate the instantaneous wall thickness measurement developed by the straight through and backscatter detector channels, the outputs for curve amplifiers 68 and 69 may be applied to a cross correlator 71, similar to cross correlator 61, which may, in turn, be connected to an appropriate indicator circuit 73, While a preferred embodiment of the invention has been illustrated and described, it is obvious that various substitutions or modifications of structure may be made without varying from the scope of the invention.

We claim:

1. A device for determining the wall thickness of a tubular member, comprising:
    a penetrating ray source located outside of the member for directing a penetrating ray diametrically through the tubular member;
    a detector means disposed on the opposite side of the tubular member from said source in the path of said ray and operative to produce an electrical output that is a function of the energy of said ray, after having passed through said tubular member;
    means for effecting relative rotation between the tubular member and both said source and detector means;
    rotational position sensing means for producing an output upon completion of a predetermined relative rotational advancement between the tubular member and both said source and detector means; and
    signal storage means connected to said detector means and to said rotational position sensing means for producing an output that is a measure of the average wall thickness of the member as measured during said predetermined relative rotational advancement.

2. A device in accordance with claim 1, wherein said rotational position sensing means produces an output upon completion of a rotational advancement of one-half of a revolution, and wherein said signal storage means produces an output that is a measure of the average wall thickness of the member around its entire periphery.

3. A device for determining the wall thickness of a tubular member, comprising:
    a penetrating ray source located outside of the member for directing a penetrating ray at the wall of the tubular member;
    a detector means disposed on the outside of the member to receive backscattered emissions from said wall to produce an electrical output that is a function of the energy of the backscatter emissions;
    means for effecting relative rotation between the tubular member and both said source and detector means;
    rotational position sensing means for producing an output upon completion of a predetermined relative rotational advancement between the tubular member and both said source and detector means; and
    signal storage means connected to said detector means and said rotational position sensing means for producing an output that is a measure of the average wall thickness of the member as measured during said predetermined relative rotational advancement.

4. A device in accordance with claim 3, wherein said rotational position sensing means produces an output upon completion of a rotational advancement of one revolution, and wherein said signal storage means produces an output that is a measure of the average wall thickness of the member around its entire periphery.

5. A device for determining the wall thickness of a tubular member, comprising:
    a penetrating ray source located outside of the member for directing a penetrating ray diametrically through the member;
    a detector means disposed on the opposite side of the member from said source in the path of said ray and operative to produce an electrical output that is a function of the strength of said ray;
    means for effective relative rotation between the tubular member and both of said source and detector means;
    speed indicating means for producing an output voltage that is a function of the speed of said relative rotation; and
    a field effect transistor coupled to the output of said detector means, the output voltage of said speed indicating means connected as a control voltage for said field effect transistor, causing the drain resistance thereof to be a function of said speed.

6. A device for determining the wall thickness of a tubular member, comprising:
    a penetrating ray source located outside of the member for directing a penetrating ray at the wall of the tubular member;
    a detector means disposed on the outside of the member to receive backscattered emissions from said wall to produce an electrical output that is a function of the energy of said backscatter emissions;
    means for effecting relative rotation between the tubular member and both said source and detector means;
    speed indicating means for producing an output voltage that is a function of the speed of said relative rotation; and a field effect transistor coupled to the output of said detector means, said speed indicating means connected as a control voltage for said field effect transistor, causing the drain resistance thereof to be a function of said speed.

7. In a radiation inspection apparatus for determining the wall thickness of a tubular member including:
a substantially uniform penetrating ray source located outside of the member for directing a penetrating ray into the wall of the member;
detector means located to receive rays emanating from the tubular member after being affected by the wall thickness of the member;
rotating means for effecting relative rotation at a nominal speed between the member and both of said source and said detector means to move the wall of the member therepast;
said detector means producing a voltage that is a function of the strength of the received emanating rays for a unit of circumferential length of the pipe moving therepast;
the improvement comprising:
speed sensing means for producing a voltage that is a function of said relative rotation; and
speed compensating means including a voltage adjustable time constant network operatively connected to the detector means as an input and to said speed sensing means as an adjustable voltage for said time constant network to make the output substantially a function of the unit circumferential length of the pipe regardless of the relative rotational speed variance from the nominal speed.

8. In a radiation inspection apparatus as described in claim 7, the further improvement comprising:
revolution position sensing means for producing an output upon the completion of a predetermined relative rotational advancement; and
voltage storage means connected to said speed compensating means and to said revolution position sensing means for producing an output that is a measure of the average wall thickness of the member over the circumferential length of the member corresponding to said predetermined relative rotational advancement.

9. In a radiation inspection apparatus as described in claim 8, wherein the detector means is located on the opposite side of the member from the source in the path of said ray, the further improvement wherein said revolution position sensing means produces an output for an integral number of one-half revolutions of relative rotational advancements, the resulting output from said signal storage means thereby becoming a measure of the average wall thickness of the member around its entire periphery.

10. In a radiation inspection apparatus as described in claim 8, wherein the detector means is located on the outside of the member to receive backscattered emissions from the wall of the member, the further improvement wherein said revolution position sensing means produces an output for an integral number of complete revolutions of relative rotational advancements, the resulting output from said signal storage means thereby becoming a measure of the average wall thickness of the member around its entire periphery.

11. A radiation inspection apparatus for determining the wall thickness of a tubular member, comprising:
a substantially uniform penetrating ray source located outside of the member for directing a penetrating ray into the wall of the member;
straight through detector means located on the opposite side of the member from the source in the path of said ray;
backscatter detector means located on the outside of the member to receive backscattered reflections from the wall of the member;
rotating means for effecting relative rotation at a nominal speed between the member and each of said source, said straight through detector and said backscatter detector means;
said straight through detector means producing a voltage that is a function of the strength of the received emanating rays for a unit of circumferential length of the member moved with respect thereto at nominal speed;
said backscatter detector means producing a voltage that is a function of the strength of the received emanating rays for a unit of circumferential length of the member moved with respect thereto at nominal speed;
speed sensing means for producing a voltage that is a function of said relative rotation;
first speed compensating means including a voltage adjustable time constant network operatively connected to said straight through detector means as an input and to said speed sensing means as an adjustable voltage for said time constant network to make a straight through output that is substantially a function of the unit circumferential length of the member regardless of the relative rotational speed variance from the nominal speed;
second speed compensating means including a voltage adjustable time constant network operatively connected to said backscatter detector means as an input and to said speed sensing means as an adjustable voltage for said time constant network to make a backscatter output that is substantially a function of the unit circumferential length of the member regardless of the relative rotational speed variance from the nominal speed; and
correlation means for receiving said straight through output and said backscatter output to produce a composite output that is a function of the products of both.

12. A radiation inspection apparatus as described in claim 11, and including:
first revolution position sensing means for producing an output upon the completion of an integral number of one-half revolutions of relative rotational advancements of said member and said straight through detector means;
first voltage storage means connected to said first speed compensation means and to said first revolution position sensing means for producing a straight through output that is a measure of the average wall thickness of the member around its entire periphery;
second revolution position sensing means for producing an output upon the completion of an integral number of revolutions of relative rotation advancements of said member and said backscatter detector means; and
second voltage storage means connected to said second speed compensating means and to said second revolution position sensing means for producing a backscatter output that is a measure of the average wall thickness of the member around its entire periphery.

13. A radiation inspection apparatus as described in claim 12, and including:
a first nonlinear compensating network for receiving the output voltage from said first voltage storage means and producing an output that is a linear measure of the average wall thickness of the member around its entire periphery; and
a second nonlinear compensating network for receiving the output voltage from said second voltage storage means and producing an output that is a linear measure of the average wall thickness of the member around its entire periphery.

14. The method of inspecting pipe for wall thickness determination, which comprises:
penetrating the two opposing walls of the pipe with a narrow beam penetrating ray;
straight through detecting the ray beam following the traversing of both walls as a measure of average wall thickness of said two walls;
developing an electrical signal that is a function of the received straight through ray;
detecting the reflected backscattered rays from the nearest one wall of the pipe as a measure of near wall thickness;
developing an electrical signal that is a function of the received reflected backscatter ray;
correlating said developed signals as a single output;

effecting rotation of the beam and of means for detecting the beam while penetrating and detecting; and storing the developed electrical signals during a predetermined relative rotation so as to make the output a function of a known circumferential length of pipe.

15. The method as described in claim 14, further comprising correcting each developed electrical signal so that it is a linear function of pipe wall thickness prior to correlation.

16. A device for determining the wall thickness of a tubular member, comprising:

a penetrating ray source located outside of the member for directing a penetrating ray diametrically through the tubular member;

a detector means disposed on the opposite side of the member from said source in the path of said ray and operative to produce an electrical output that is a function of the strength of said ray, said detector means including a scintillation crystal and a photomultiplier connected thereto;

means for controlling the sensitivity of said detector means as determined by an applied adjustable voltage, said controlling means including a DC-to-DC converter, the output of which is applied to the dynodes of said photomultiplier, the input of which provides means to control the output from said converter and thereby the amplification of said photomultiplier; and means for effecting relative rotation between the tubular member and all of said source, said detector means and the portion of said controlling means including said DC-to-DC converter, the applied adjustable voltage for said DC-to-DC converter being applied from a nonrotating source through slip rings.

17. A device as described in claim 16, and further including:

second detector means disposed on the outside of the member to receive backscatter emissions from said wall to produce an electrical output that is a function of the strength of said emission, said second detector means including a second scintillation crystal and a second photomultiplier connected thereto;

second means for controlling the sensitivity of said second detector means as determined by a second applied adjustable voltage, said second controlling means including a second DC-to-DC converter, the output of which is applied to the dynodes of said second photomultiplier, the input of which provides means to control the output from said second converter and thereby the amplification of said second photomultiplier; and said second detector means and the portion of said second controlling means including said second DC-to-DC converter being connected for relative rotation with respect to the tubular member, the second applied adjustable voltage for said second DC-to-DC converter being applied from a second non rotating source through slip rings.

18. A device for determining the wall thickness of a tubular member comprising:

a penetrating ray source located outside of the member for directing a penetrating ray at the wall of the tubular member;

detector means disposed on the outside of the member to receive backscatter emissions from said wall to produce an electrical output that is a function of the strength of said emissions, said detector means including a scintillation crystal and a photomultiplier connected thereto;

means for controlling the sensitivity of said detector means as determined by an applied adjustable voltage, said controlling means including a DC-to-DC converter, the output of which is applied to the dynodes of said photomultiplier, the input of which provides means to control the output from said converter and thereby the amplification of said photomultiplier; and means for effecting relative rotation between the tubular member and all of said source, said detector means and the portion of said controlling means including said DC-to-DC converter, the applied adjustment voltage for said DC-to-DC converter being applied from a nonrotating source through slip rings.

19. A device for determining the wall thickness of a tubular member, comprising:

a penetrating ray source located outside of the member for directing a penetrating ray through the tubular member;

detector means disposed on the opposite side of the member from said source in the path of said ray and operative to produce an electrical output signal that is a function of the energy of the detected ray after having passed through said tubular member;

said detector being controllable in sensitivity of detection by means of a controllable high voltage applied thereto;

converter means connected to said detector means and operable to receive a low DC voltage and produce an output high DC voltage whose magnitude is a function of said input low voltage;

rotary mounting means for mounting said ray source, said detector means, and said converter means for rotation coaxially about said tubular member;

rotary contact means for effecting electrical connection between said converter means and a nonrotating low DC voltage source separate from said rotary mounting means; and voltage adjustment means located separate from said rotary mounting means and connected to said low voltage source for adjusting the magnitude of the low voltage coupled to said rotary contact means, whereby the adjustment of the magnitude of said low voltage by the voltage adjustment means results in the adjustment of the magnitude of the high voltage output from the converter means, thereby to adjust the sensitivity of the detector means.

20. A device as claimed in claim 19, wherein the detector means includes:

a scintillation crystal and a photomultiplier connected thereto; and wherein the output high DC voltage of the converter means is applied to dynodes of said photomultiplier.

21. A device for determining the wall thickness of a tubular member; comprising a penetrating ray source located outside of the member for detecting a penetrating ray at the tubular member;

detector means disposed on the outside of the member to receive backscatter emissions from said wall to produce an electrical output signal that is a function of the energy of detected backscatter emissions from said wall;

said detector being controllable in sensitivity of detection by means of a controllable high voltage applied thereto;

converter means connected to said detector means and operable to receive a low DC voltage and produce an output high DC voltage whose magnitude is a function of said input low voltage;

rotary mounting means for mounting said ray source, said detector means, and said converter means for rotation coaxially about said tubular member;

rotary contact means for effecting electrical connection between said converter means and a nonrotating low DC voltage source separate from said rotary mounting means; and voltage adjustment means located separate from said rotary mounting means and connected to said low voltage source for adjusting the magnitude of the low voltage coupled to said rotary contact means, whereby the adjustment of the magnitude of said low voltage from the voltage adjustment means results in the adjustment of the magnitude of the high voltage output from the converter means, thereby to adjust the sensitivity of the detector means.

22. The device claimed in claim 21, wherein the detector means includes:

a scintillation crystal and a photomultiplier connected thereto; and wherein the output high DC voltage of the converter means is applied to dynodes of said photomultiplier.

23. The device claimed in claim 5, wherein said field effect transistor is included in a time constant network and the operation of said transistor causes the output of the time constant network to be a function of wall thickness and to be compensated for said speed of relative rotation.

24. The device claimed in claim 23, wherein the output of said time constant network is a nonlinear function of measured wall thickness, said device further including, a compensating network for receiving the output of the time constant network and producing a voltage that changes linearly with a linear change in measured wall thickness.

25. The combination claimed in claim 24 wherein said compensating network comprises:
an amplifier having an input and an output;
a first resistor operatively connected to said amplifier;
a plurality of parallel circuits for compensating for respective predetermined voltage ranges of an applied voltage;
each of said parallel circuits including a diode series connected to a resistor;
the first one of said plurality of parallel circuits being connected in parallel with said first resistor and each next successive one of the plurality of parallel circuits being connected in parallel with the next preceeding one of the plurality of parallel circuits; and
said plurality of parallel circuits being interconnected so that only said first one is connected directly between the input and output of the first resistor.

26. The combination claimed in claim 25, wherein said first resistor is connected as an input resistor to said amplifier.

27. The combination claimed in claim 25 wherein said first resistor is connected between the input and output of said amplifier.

28. The combination claimed in claim 24, wherein said compensating network comprises:
an amplifier having an input and an output;
a first resistor operatively connected to said amplifier;
a plurality of parallel circuits for compensating for respective predetermined voltage ranges of an applied voltage;
each of said parallel circuits including:
a pair of matched diodes connected anode-to-cathode to form a parallel combination;
a resistor connected to one end of the parallel connected diodes to form a series circuit therewith;
the first one of said plurality of parallel circuits being connected in parallel with said first resistor and each next successive one of the plurality of parallel circuits being connected in parallel with the next preceeding one of the plurality of parallel circuits; and
said plurality of parallel circuits being interconnected so that only said first one is connected directly between the input and output of the first resistor.

29. The device claimed in claim 6 wherein
said field effect transistor is included in a time constant network and the operation of said transistor causes the output of the time constant network to be a function of wall thickness and to be compensated for said speed of relative rotation.

30. The device claimed in claim 29 wherein the output of said time constant network is a nonlinear function of measured wall thickness,
said device further including,
a compensating network for receiving the output of the time constant network and producing a voltage that changes linearly with a linear change in measured wall thickness.

31. A device for determining the wall thickness of a tubular member, comprising:
a penetrating ray source located outside of the member for detecting a penetrating ray toward the tubular member;
first and second detector means disposed, respectively, on the adjacent and opposite sides of the member from said source, each of said detector means being operative to produce a respective electrical output signal that is a function of the energy of the detected backscatter and direct rays emanating from said tubular member;
each of said detector means being controllable in sensitivity of detection by means of a respective high DC voltage applied thereto;
first and second converter means respectively connected to said first and second detector means and each operable to receive a respective low DC voltage and produce a respective output high DC voltage whose magnitude is a function of the respective input low DC voltage;
rotary mounting means for mounting said ray source, said two detector means, and said two converter means for rotation coaxially about said tubular member;
rotary contact means for effecting electrical connection between said two converter means and a nonrotating low DC voltage source that is located separate from said rotary mounting means;
first and second voltage adjustment means located separate from said rotary mounting means and each connected to said low voltage source and each connected through said rotary contact means to a respective one of said converter means; and
said two voltage adjustment means each being operable to adjust the magnitude of a low DC voltage coupled to its respective converter means on said rotary mounting means, whereby the high DC voltages applied to the two detector means may be independently adjusted external to said rotary mounting means thereby to adjust the sensitivities of the respective detector means.

32. The device claimed in claim 31, and further including:
first and second speed compensating means respectively connected to receive the outputs of said first and second detector means;
means respective to the speed of relative rotation of said rotary mounting means about said tubular member for producing a speed-dependent voltage whose magnitude is a function of said relative speed of rotation;
said speed compensating means being responsive to said speed-dependent voltage to produce a output voltage substantially independent of effects caused by a change in relative speed of rotation of the rotary mounting means about said tubular member; and
correlating means coupled to receive the outputs of said first and second speed compensating means and responsive thereto to produce a wall thickness signal which is a function of the produce of the outputs of said two speed compensating means.

33. the combination claimed in claim 32, and further including:
first and second cross section integrating means respectively coupled to the outputs of said first and second speed compensating means;
said first cross section integrating means integrating the input signal coupled thereto and producing an output signal that is a measure of the average wall thickness of the tubular member around its periphery;
said second cross section integrating means integrating the signal applied thereto and producing an output signal that is a measure of the average wall thickness of the tubular member around its entire periphery; and
correlating means respective to the outputs of said first and second cross section integrating means for producing an average wall thickness signal that is a function of the produce of the outputs of said two cross section integrating means.

34. A compensating network that produces an output which changes in magnitude according to a desired characteristic when responding to an input voltage whose magnitude changes in the same direction but not according to said desired characteristic, said network comprising:
an amplifier having an input and an output;
a first resistor operatively connected to said amplifier;
a plurality of parallel circuits for compensating for respective predetermined voltage ranges of an applied voltage;

each of said parallel circuits including;
a plurality of parallel circuits for compensating for respective predetermined voltage ranges of an applied voltage;
each of said parallel circuits including a diode series connected to a resistor;
the first one of said plurality of parallel circuits being connected in parallel with said first resistor and each next successive one of the plurality of parallel circuits being connected in parallel with the next preceeding one of the plurality of parallel circuits; and
said plurality of parallel circuits being interconnected so that only said first one is connected directly between the input and output of the first resistor.

35. The network claimed in claim 34, wherein said first resistor is connected as an input resistor to said amplifier and said applied voltage is connected to the input of said first resistor.

36. The combination claimed in claim 34, wherein said first resistor is connected between the input and output of said amplifier and said applied voltage is connected to the input of said amplifier.

37. The combination claimed in claim 34, and further including,
another diode in each of said parallel circuits, the other diode in each of said circuits being parallel connected only with the first named diode in said circuit but oppositely poled with respect thereto.